US011941216B1

(12) United States Patent
Wu

(10) Patent No.: US 11,941,216 B1
(45) Date of Patent: Mar. 26, 2024

(54) TOUCH PAD WITH KEY INPUT FUNCTION

(71) Applicant: Primax Electronics Ltd., Taipei (TW)

(72) Inventor: Chien-Hui Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/215,142

(22) Filed: Jun. 27, 2023

(30) Foreign Application Priority Data

May 9, 2023 (TW) .................................. 112117203

(51) Int. Cl.
*G06F 3/044* (2006.01)
*G06F 3/041* (2006.01)
(52) U.S. Cl.
CPC .......... *G06F 3/0446* (2019.05); *G06F 3/0416* (2013.01)
(58) Field of Classification Search
None
See application file for complete search history.

(56) References Cited

U.S. PATENT DOCUMENTS

2014/0085860 A1* 3/2014 Wang .................... G06F 3/0202
362/23.03
2018/0171660 A1* 6/2018 Snider .................... B32B 27/06

* cited by examiner

*Primary Examiner* — Christopher J Kohlman
(74) *Attorney, Agent, or Firm* — KIRTON McCONKIE; Evan R. Witt

(57) ABSTRACT

A touch pad includes a circuit board, plural LED light-emitting elements, a light guide plate and a light-transmissible touch structure. A touch sensing layer is formed on a top surface of the circuit board. The touch sensing layer includes plural touch sensing units. The plural LED light-emitting elements are arranged between the plural touch sensing units. The light guide plate is located over the touch sensing layer and arranged beside the plural LED light-emitting elements. The light-transmissible touch structure includes plural light-transmissible patterns. The light-transmissible touch structure is located over the plural LED light-emitting elements and the light guide plate. A touch control operation is performed on the light-transmissible touch structure by the user. The two terminals of each LED light-emitting element are respectively installed on blank regions of two corresponding sensing circuit regions.

12 Claims, 7 Drawing Sheets

TOUCH PAD WITH KEY INPUT FUNCTION

FIELD OF THE INVENTION

The present invention relates to a touch pad with a key input function, and more particularly to a touch pad with LED light-emitting elements and with a key input function.

BACKGROUND OF THE INVENTION

Nowadays, notebook computers become essential tools for modern people in their daily lives. The user can operate an external mouse device to control a notebook computer. In addition, the notebook computer is usually equipped with a touch pad. The user can move a cursor or perform a clicking control operation through the touch pad.

With the advancement of the touch control technology and the backlight technology, the touch pads installed in many notebook computers are designed to have a built-in key input function. For example, when a specified position of the touch pad is pressed down, a backlight module under the touch pad is enabled to display plural numbers, symbols or light-transmissible patterns. At the same time, the positions of the touch pad corresponding to the displayed numbers or symbols are changed to corresponding key regions. When one key region of the touch pad is touched by the user, the function of inputting a corresponding digital number (or symbol), a Backspace function, an Enter function or an associated function is executed.

A touch pad with a key input function will be described as follows. FIG. 1A is a schematic side view illustrating the structure of a conventional touch pad with a key input function. FIG. 1B is a schematic top view illustrating a light-transmissible touch structure of the conventional touch pad as shown in FIG. 1A.

As shown in FIG. 1A, the touch pad 1 with the key input function at least comprises a circuit board 10, plural LED light-emitting elements 13 and a light guide plate 12. In addition, a touch sensing layer 11 is formed on a top surface 101 of the circuit board 10. The plural LED light-emitting elements 13 are installed on an edge of the touch sensing layer 11. In addition, the plural LED light-emitting elements 13 are arranged beside the light guide plate 12, which is located over the touch sensing layer 11. The plural LED light-emitting elements 13 are side-view LED light-emitting elements. The plural LED light-emitting elements 13 emit plural light beams. After the plural light beams are introduced into the light guide plate 12 through a light input surface 121 of the light guide plate 12, the light beams are guided by the light guide plate 12 and diffused to the overlying region. Consequently, a surface light source is provided.

The touch pad 1 further comprises a light-transmissible touch structure 14. The light-transmissible touch structure 14 is located over the plural LED light-emitting elements 13 and the light guide plate 12. The user can perform a touch control operation on the light-transmissible touch structure 14. The light-transmissible touch structure 14 at least comprises a mask layer 141, a diffusion layer 142 and a light-transmissible plate 143. The mask layer 141 is located over the light guide plate 12. The diffusion layer 142 is located over the mask layer 141 in order to diffuse and homogenize the light beams. The light-transmissible plate 143 is located over the diffusion layer 142. Moreover, as shown in FIG. 1B, plural light-transmissible patterns 1411 are formed in the mask layer 14. After the light beams from the LED light-emitting elements 13 are transmitted through the light-transmissible patterns 1411, the light-transmissible patterns 1411 are visible by the user. Consequently, the user can perform the touch control operation on a light-transmissible surface 1431 of the light-transmissible plate 143.

However, due to the position relationships between the LED light-emitting elements 13 and the touch sensing layer 11, the conventional touch pad 1 still has some drawbacks. For example, when the user performs the touch control operation on a portion of the region over the touch sensing layer 11, an additional sensing compensation process is required. After the sensing compensation process is completed, the touch pad 1 can effectively and correctly detect or sense the touch control operation that is performed on the light-transmissible surface 1431 of the light-transmissible plate 143 with the user's finger or an object.

FIG. 1C schematically illustrates the relationship between the plural LED light-emitting elements 13, the circuit board 10 and the plural touch sensing units of the touch sensing layer 11 in the touch pad 1. For succinctness, only the relationship between three touch sensing units 111, 112 and 113 of the touch sensing layer 11 over the top surface 101 of the circuit board 10 and two LED light-emitting elements 131 and 132 of the plural LED light-emitting elements 13 will be described as follows.

As shown in FIG. 1C, the touch sensing unit 111 comprises a sensing circuit region 1111 and a driving circuit region 1112. The sensing circuit region 1111 and the driving circuit region 1112 are arranged beside each other. The sensing circuit region 1111 is arranged around the driving circuit region 1112. In addition, the sensing circuit region 1111 and the driving circuit region 1112 are closed-type copper foil conductor regions and collaboratively formed as a capacitive sensing structure.

Similarly, the touch sensing unit 112 comprises a sensing circuit region 1121 and a driving circuit region 1122, and the touch sensing unit 113 comprises a sensing circuit region 1131 and a driving circuit region 1132.

The LED light-emitting element 131 is welded and arranged between the touch sensing unit 111 and the touch sensing unit 112. A first solder point 1311 of the LED light-emitting element 131 influences portions of the sensing circuit region 1111 and the driving circuit region 1112 of the touch sensing unit 111. For installing the first solder point 1311, it is necessary to remove the influenced portions of the copper foil conductor regions. Similarly, a second solder point 1312 of the LED light-emitting element 131 influences portions of the sensing circuit region 1121 and the driving circuit region 1122 of the touch sensing unit 112. For installing the second solder point 1312, it is necessary to remove the influenced portions of the copper foil conductor regions.

In other words, the areas of the touch-sensitive copper foil conductor regions in the touch sensing unit 111 (or the touch sensing unit 112) are obviously smaller than the areas of the touch-sensitive copper foil conductor regions in the touch sensing unit 113. In addition, the capacitive sensing effect of the touch sensing unit 111 (or the touch sensing unit 112) is obviously different from the capacitive sensing effect of the touch sensing unit 113. For overcoming the drawbacks of the touch sensing unit 111 and the touch sensing unit 112, the touch pad 1 needs to undergo an additional sensing compensation process. Consequently, when the user performs the touch control operation on the position over the ouch sensing unit 111 or the touch sensing unit 112 with the user's finger or the object, the touch pad 1 can effectively and correctly detect or sense the touch control operation.

As mentioned above, the additional sensing compensation process increases the cost and the complexity of the conventional touch pad 1. In order to overcome the drawbacks of the conventional technologies, it is important to provide an improved touch pad with a simplified structure for avoiding the influence of the LED light-emitting elements on the capacitive sensing effect of the touch sensing layer.

SUMMARY OF THE INVENTION

In order to overcome the drawbacks of the conventional technologies, the present invention provides a touch pad with a key input function. In addition, the touch pad includes a simplified structure for avoiding the influence of the LED light-emitting elements on the capacitive sensing effect.

In accordance with an aspect of the present invention, a touch pad with a key input function is provided. The touch pad includes a circuit board, plural LED light-emitting elements, a light guide plate and a light-transmissible touch structure. A touch sensing layer is formed on a top surface of the circuit board. The touch sensing layer includes plural touch sensing units. The plural LED light-emitting elements are arranged between the plural touch sensing units. The light guide plate is located over the touch sensing layer and arranged beside the plural LED light-emitting elements. The LED light-emitting elements receive plural light beams, and the plural light beams are guided by the light guide plate. Consequently, a surface light source is provided. The light-transmissible touch structure includes plural light-transmissible patterns. The light-transmissible touch structure is located over the plural LED light-emitting elements and the light guide plate. A touch control operation is performed on the light-transmissible touch structure by the user. A first touch sensing unit of the plural touch sensing units includes a first sensing circuit region, a first driving circuit region and a first blank region. A second touch sensing unit of the plural touch sensing units includes a second sensing circuit region, a second driving circuit region and a second blank region. A first terminal of a first LED light-emitting element of the plural LED light-emitting elements is transferred across the first sensing circuit region and the first driving circuit region and installed in the first blank region. A second terminal of the first LED light-emitting element is transferred across the second sensing circuit region and the second driving circuit region and installed in the second blank region.

In an embodiment, the first sensing circuit region and the first driving circuit region are located beside each other and collaboratively formed as a first capacitive sensing structure, and the second sensing circuit region and the second driving circuit region are located beside each other and collaboratively formed as a second capacitive sensing structure.

In an embodiment, the first sensing circuit region is arranged around the first driving circuit region and the first sensing circuit region and the first driving circuit region are closed-type copper foil conductor regions, or the second sensing circuit region and the second driving circuit region are open-type copper foil conductor regions in symmetric and complementary arrangement.

In an embodiment, the second sensing circuit region is arranged around the second driving circuit region and the second sensing circuit region and the second driving circuit region are closed-type copper foil conductor regions, or the second sensing circuit region and the second driving circuit region are open-type copper foil conductor regions in symmetric and complementary arrangement.

In an embodiment, the plural LED light-emitting elements are side-view LED light-emitting elements.

In an embodiment, the light guide plate includes at least one light input surface. The at least one light input surface is located beside and aligned with the side-view LED light-emitting elements to receive the plural light beams from the side-view LED light-emitting elements.

In an embodiment, the light guide plate includes plural trench structures. When the light guide plate is disposed over the touch sensing layer, the plural side-view LED light-emitting elements are inserted in the corresponding trench structures, and each of the plural trench structures has one of the at least one light input surface. The light input surface of each trench structure is aligned with the corresponding side-view LED light-emitting element to receive the light beam from the corresponding LED light-emitting element.

In an embodiment, the light-transmissible touch structure at least includes a mask layer and a light-transmissible plate. The mask layer is located over the light guide plate. The light-transmissible plate is located over the mask layer. The plural light-transmissible patterns are formed in the mask layer. The plural light beams are transmitted through the plural light-transmissible patterns and the light-transmissible plate. The user performs the touch control operation on a light-transmissible surface of the light-transmissible plate.

In an embodiment, the light-transmissible touch structure further includes a diffusion layer. The diffusion layer is arranged between the mask layer and the light-transmissible plate. The plural light beams are diffused and homogenized by the diffusion layer.

In an embodiment, the first terminal of the first LED light-emitting element and the second terminal of the first LED light-emitting element are respectively installed on the first touch sensing unit and the second touch sensing unit. The first touch sensing unit and the second touch sensing unit are located adjacent to each other, or the first touch sensing unit and the second touch sensing unit are not located adjacent to each other.

In an embodiment, a longest distance of the first blank region of the first touch sensing unit is shorter than a length of first LED light-emitting element, and a longest distance of the second blank region of the second touch sensing unit is shorter than the length of first LED light-emitting element.

In an embodiment, a longest distance of the first blank region of the first touch sensing unit is shorter than a distance between a first solder point and a second solder point of the first LED light-emitting element, and a longest distance of the second blank region of the second touch sensing unit is shorter than the distance between the first solder point and the second solder point of the first LED light-emitting element.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 2A:
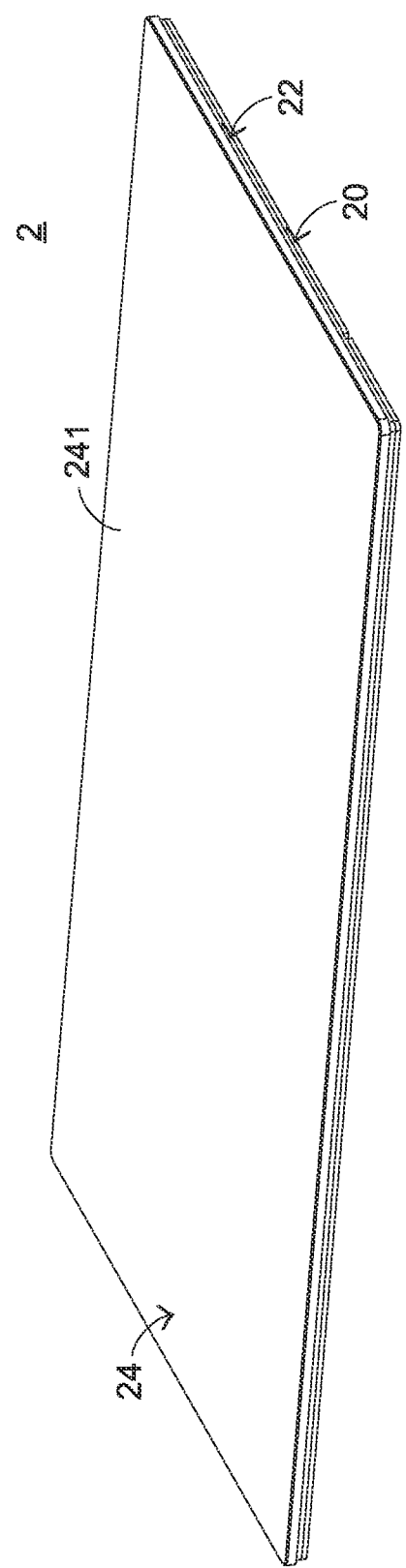
FIG. 2A is a schematic perspective view illustrating an assembled structure of a touch pad with a key input function according to a first embodiment of the present invention.
Figure 2B:
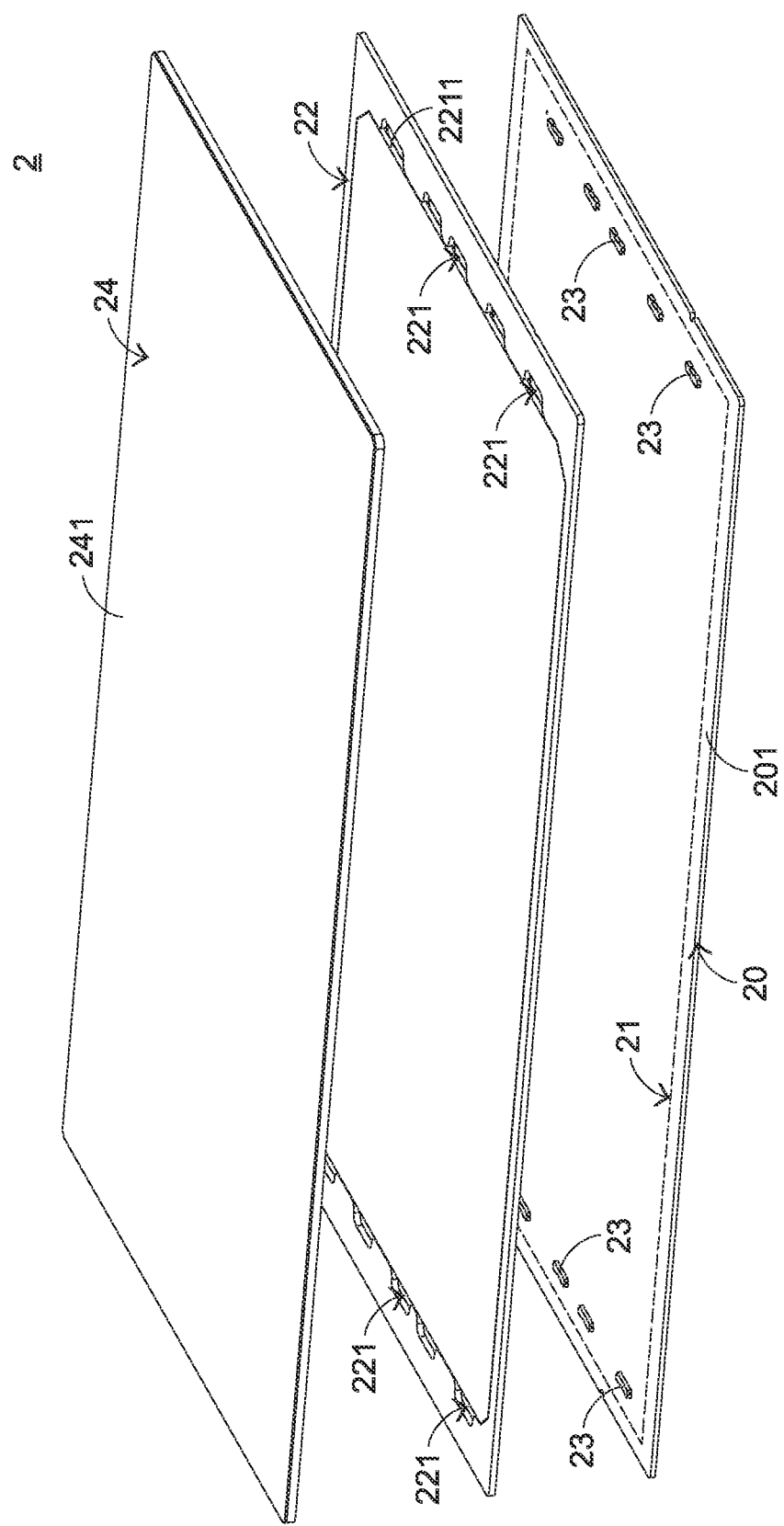
FIG. 2B is a schematic exploded view illustrating the touch pad according to the first embodiment of the present invention and taken along a viewpoint.
Figure 2C:
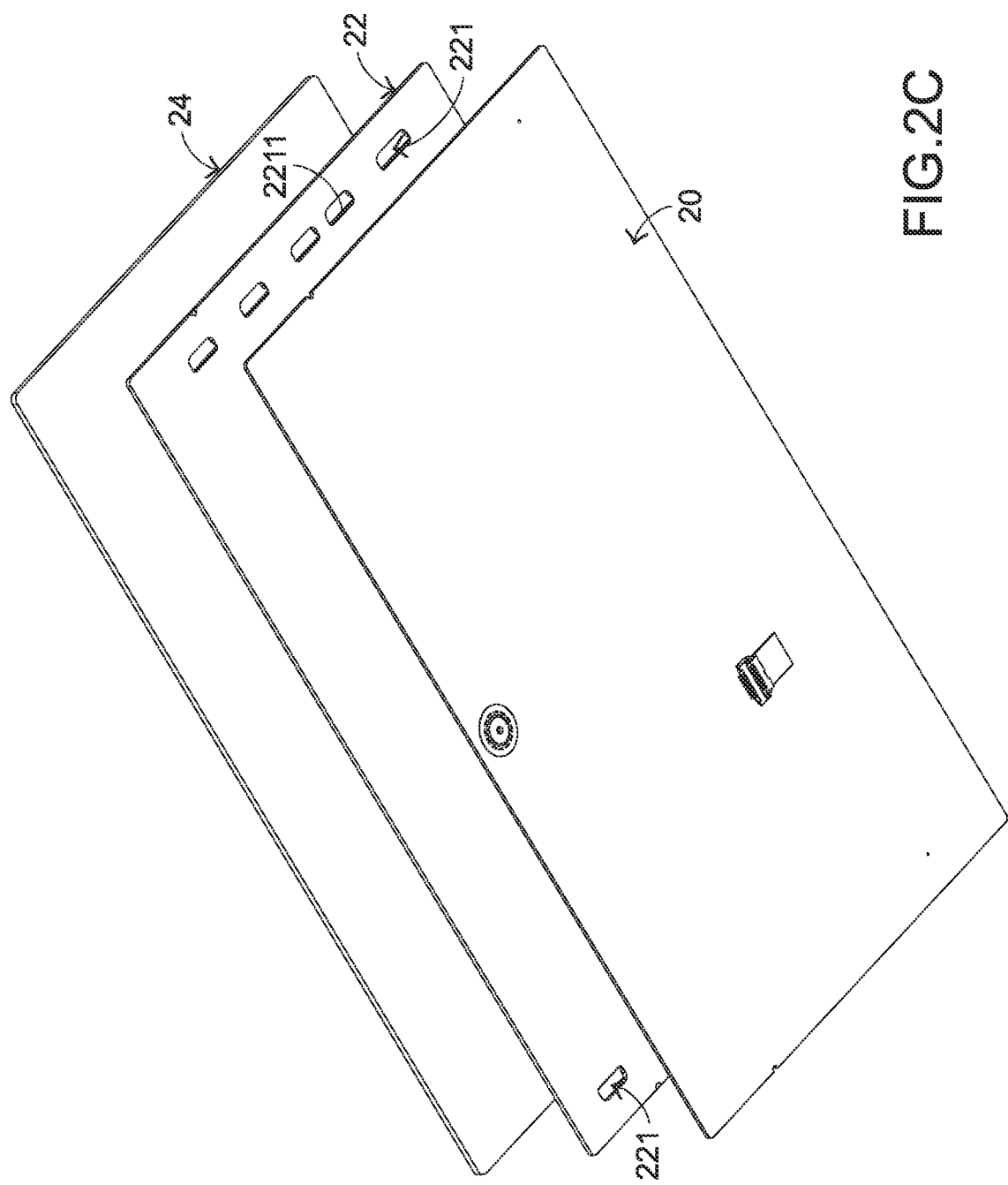
FIG. 2C is a schematic exploded view illustrating the touch pad according to the first embodiment of the present invention and taken along another viewpoint.

FIG. 2A is a schematic perspective view illustrating an assembled structure of a touch pad with a key input function according to a first embodiment of the present invention. FIG. 2B is a schematic exploded view illustrating the touch pad according to the first embodiment of the present invention and taken along a viewpoint. FIG. 2C is a schematic exploded view illustrating the touch pad according to the first embodiment of the present invention and taken along another viewpoint.

In this embodiment, the touch pad 2 with the key input function at least comprises a circuit board 20 and plural LED light-emitting elements 23. A touch sensing layer 21 is formed on a top surface 201 of the circuit board 20. The plural LED light-emitting elements 23 are arranged beside two sides of the touch sensing layer 21. The plural LED light-emitting elements 23 are installed on two edges of the touch sensing layer 21. The plural LED light-emitting elements 23 emit plural light beams. Preferably but not exclusively, the plural LED light-emitting elements 23 are side-view LED light-emitting elements.

In an embodiment, the touch pad 2 further comprises a light guide plate 22. The light guide plate 22 comprises plural trench structures 221. When the light guide plate 22 is disposed over the touch sensing layer 21, the plural LED light-emitting elements 23 are inserted in the corresponding trench structures 221. Consequently, at least one light input surface 2211 of each trench structure 221 is aligned with the corresponding LED light-emitting element 23 to receive the light beam from the corresponding LED light-emitting element 23. After the plural light beams are introduced into the light guide plate 22 through the light input surfaces 2211 of the trench structures 221 of the light guide plate 22, the light beams are guided by the light guide plate 22 and diffused to the overlying region. Consequently, a surface light source is provided.

The touch pad 2 further comprises a light-transmissible touch structure 24. The light-transmissible touch structure 24 is located over the plural LED light-emitting elements 23 and the light guide plate 22. The user can perform a touch control operation on a light-transmissible surface 241 of the light-transmissible plate 24.

Figure 1A:
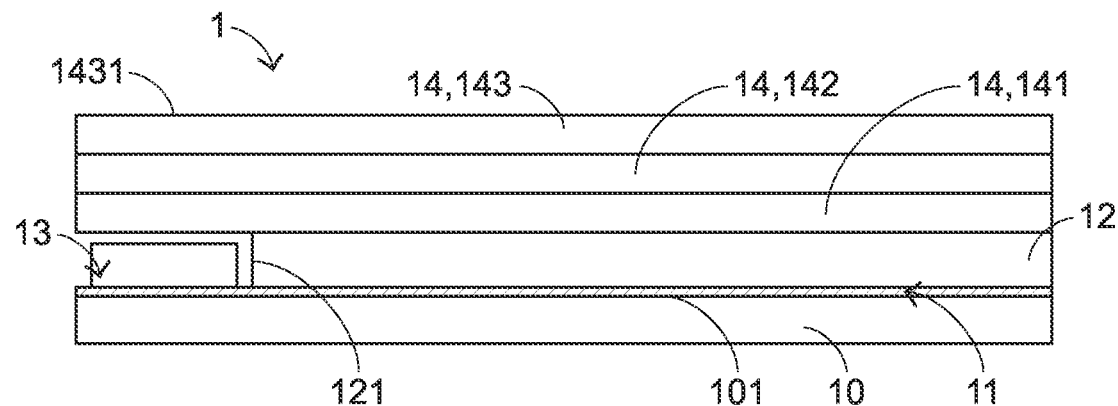
FIG. 1A is a schematic side view illustrating the structure of a conventional touch pad with a key input function.
Figure 1B:
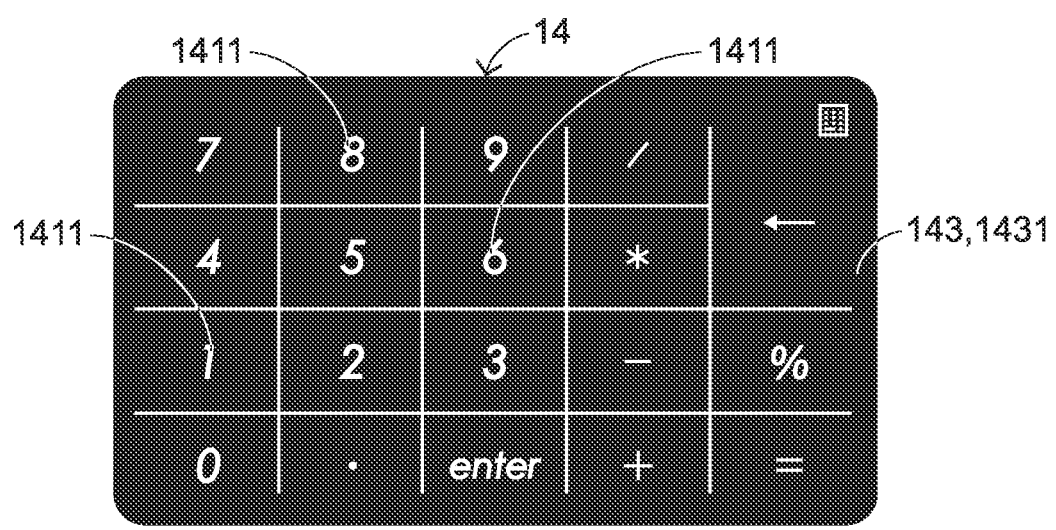
FIG. 1B is a schematic top view illustrating a light-transmissible touch structure of the conventional touch pad as shown in FIG. 1A.
Figure 1C:
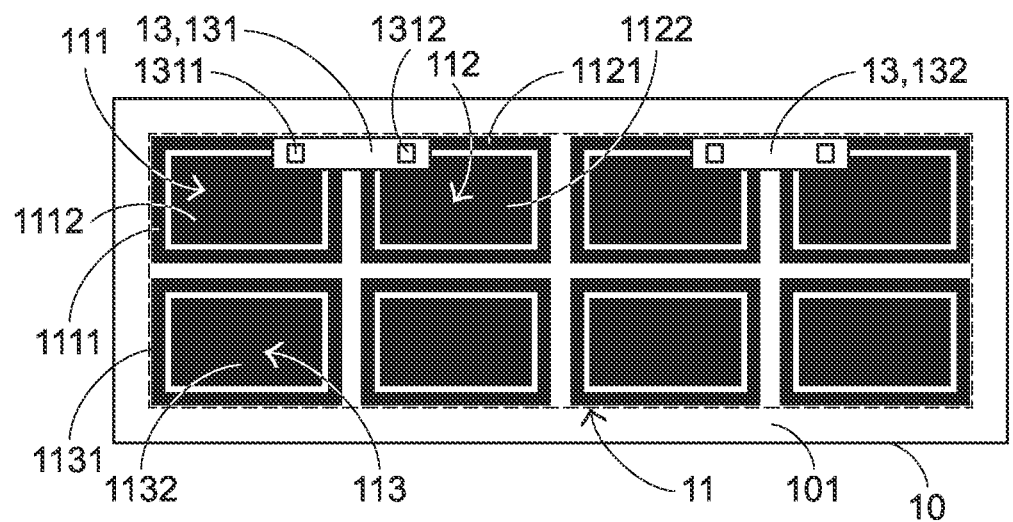
FIG. 1C schematically illustrates the relationship between the plural LED light-emitting elements, the circuit board and the plural touch sensing units of the touch sensing layer in the conventional touch pad as shown in FIG. 1A.

In an embodiment, the constituents of the light-transmissible touch structure 24 are similar to those of the light-transmissible touch structure 14 shown in FIG. 1. That is, the light-transmissible touch structure 24 comprises a mask layer (not shown), a diffusion layer (not shown) and a light-transmissible plate (not shown). The mask layer is located over the light guide plate 22. In addition, plural light-transmissible patterns (not shown) are formed in the mask layer. The diffusion layer is located over the mask layer. The light-transmissible plate is located over the diffusion layer. The functions of these layers are not redundantly described herein. In some other embodiments, the light-transmissible touch structure is not equipped with the diffusion layer.

The assembling relationships between the light guide plate 22 and the plural LED light-emitting elements 23 in this embodiment are not restricted. For example, in another embodiment, the assembling relationships between the light guide plate 22 and the plural LED light-emitting elements 23 are similar to the assembling relationships between the light guide plate 12 and the plural LED light-emitting elements 13.

Figure 3:
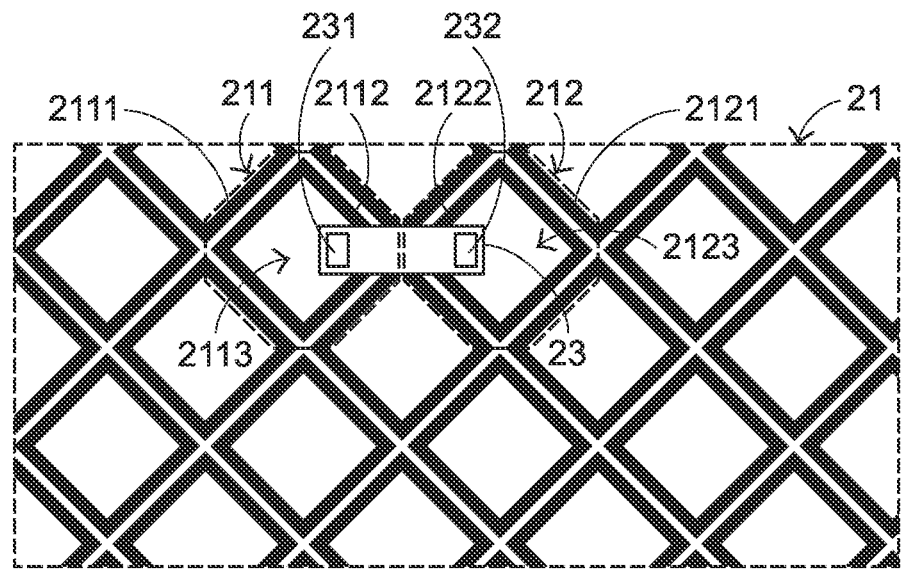
FIG. 3 schematically illustrates the relationship between the plural LED light-emitting elements and the plural touch sensing units of the touch sensing layer in the touch pad according to the first embodiment of the present invention.

In accordance with a feature of the first embodiment of the present invention, the relationship between the plural LED light-emitting elements 23 and the plural touch sensing units of the touch sensing layer 21 are specifically designed. FIG. 3 schematically illustrates the relationship between the plural LED light-emitting elements 23 and the plural touch sensing units of the touch sensing layer 21 in the touch pad 2 according to the first embodiment of the present invention. For succinctness, only the relationship between two touch sensing units 211 and 212 of the touch sensing layer 21 and the corresponding LED light-emitting elements of the plural LED light-emitting elements 23 will be described as follows.

Please refer to FIG. 3 and also FIGS. 2A, 2B and 2C. The touch sensing unit 211 comprises a sensing circuit region 2111, a driving circuit region 2112 and a blank region 2113. The sensing circuit region 2111 and the driving circuit region 2112 are arranged beside each other. The sensing circuit region 2111 is arranged around the driving circuit region 2112. In an embodiment, the sensing circuit region 2111 and the driving circuit region 2112 are closed-type copper foil conductor regions and collaboratively formed as a capacitive sensing structure. In another embodiment, the sensing circuit region 2111 and the driving circuit region 2112 are open-type copper foil conductor regions, which are symmetric and complementary to each other. It is noted that the examples of the sensing circuit region 2111 and the driving circuit region 2112 are not restricted.

Similarly, the touch sensing unit 212 comprises a sensing circuit region 2121, a driving circuit region 2122 and a blank region 2123. The sensing circuit region 2121 and the driving circuit region 2122 are arranged beside each other. The sensing circuit region 2121 is arranged around the driving circuit region 2122. In an embodiment, the sensing circuit region 2121 and the driving circuit region 2122 are closed-type copper foil conductor regions and collaboratively formed as another capacitive sensing structure.

The LED light-emitting element 23 is welded and arranged between the touch sensing unit 211 and the touch sensing unit 212. A first solder point 231 of the LED light-emitting element 23 is directly welded on the blank region 2113 of the touch sensing unit 211. Consequently, the sensing circuit region 2111 and the driving circuit region 2112 of the touch sensing unit 211 are not influenced by the first solder point 231 of the LED light-emitting element 23. A second solder point 232 of the LED light-emitting element 23 is directly welded on the blank region 2123 of the touch sensing unit 212. Consequently, the sensing circuit region 2121 and the driving circuit region 2122 of the touch sensing unit 212 are not influenced by the second solder point 232 of the LED light-emitting element 23. In other words, the LED light-emitting element 23 is spanned across the sensing circuit regions 2111, 2121 and the driving circuit regions 2112, 2122, and the two terminals of the LED light-emitting element 23 are respectively installed on the blank region 2113 of the touch sensing unit 211 and the blank region 2123 of the touch sensing unit 212.

In other words, the areas of the touch-sensitive copper foil conductor regions in the touch sensing unit 211 and the touch sensing unit 212) are not changed or influenced. In other words, the capacitive sensing effect of the touch sensing unit 211 (or the touch sensing unit 212) is not different from the capacitive sensing effect of any other touch sensing unit where no LED light-emitting element is installed. Consequently, the touch pad 2 does not need to undergo an additional sensing compensation process. When the user performs the touch control operation on the position over the ouch sensing unit 211 or the touch sensing unit 212 with the user's finger or the object, the touch pad 2 can effectively and correctly detect or sense the touch control operation.

Figure 4:
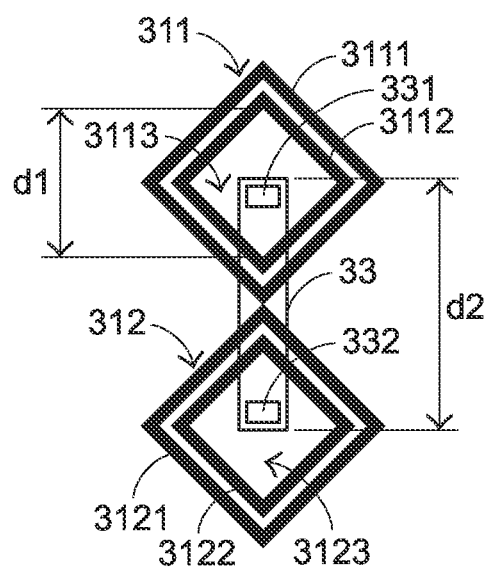
FIG. 4 schematically illustrates the relationships between the plural LED light-emitting elements and the plural touch sensing units of the touch sensing layer in a touch pad according to a second embodiment of the present invention.

FIG. 4 schematically illustrates the relationships between the plural LED light-emitting elements and the plural touch sensing units of the touch sensing layer in a touch pad according to a second embodiment of the present invention. For succinctness, only the relationship between two touch sensing units 311 and 312 of the touch sensing layer and the corresponding LED light-emitting elements of the plural LED light-emitting elements 33 will be described as follows. The LED light-emitting element 33 is welded and arranged between the touch sensing unit 311 and the touch sensing unit 312. A first solder point 331 of the LED light-emitting element 33 is transferred across a sensing circuit region 3111 and a driving circuit region 3112 of the touch sensing unit 311 and directly welded on a blank region 3113 of the touch sensing unit 311. A second solder point 332 of the LED light-emitting element 33 is transferred across the sensing circuit region 3121 and the driving circuit region 3122 of the touch sensing unit 312 and directly welded on the blank region 3123 of the touch sensing unit 312.

In the embodiments of FIGS. 3 and 4, the longest distance of the blank region of each touch sensing unit (e.g., the distance d1 shown in FIG. 4) is shorter than the length of each LED light-emitting element (e.g., the length d2 shown in FIG. 4) or shorter than the distance between the first solder point and the second solder point of each LED light-emitting element. Since the blank region of one touch sensing unit is unable to cover one LED light-emitting element, each LED light-emitting element is spanned across at least two touch sensing units.

Figure 5:
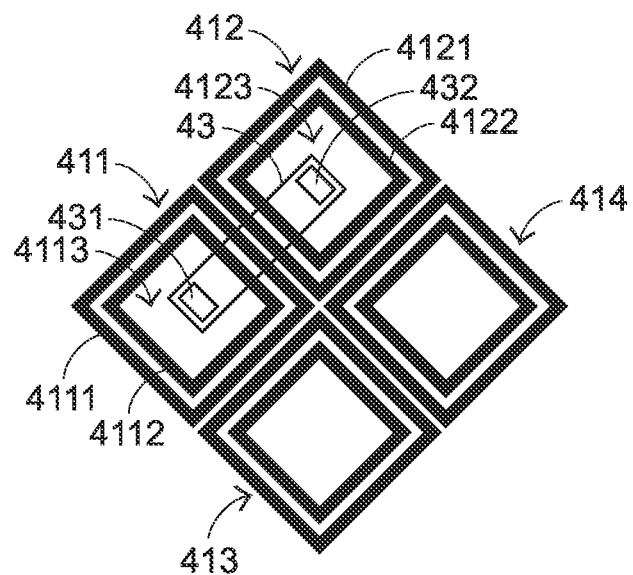
FIG. 5 schematically illustrates the relationships between the plural LED light-emitting elements and the plural touch sensing units of the touch sensing layer in a touch pad according to a third embodiment of the present invention.

It is noted that the relationships between the plural LED light-emitting elements and the plural touch sensing units of the touch sensing layer are not restricted. FIG. 5 schematically illustrates the relationships between the plural LED light-emitting elements and the plural touch sensing units of the touch sensing layer in a touch pad according to a third embodiment of the present invention. For succinctness, only the relationship between four touch sensing units 411, 412, 413 and 414 of the touch sensing layer and the corresponding LED light-emitting elements of the plural LED light-emitting elements 43 will be described as follows. The LED light-emitting element 43 is welded and arranged between the touch sensing unit 411 and the touch sensing unit 412 in an inclined arrangement. A first solder point 431 of the LED light-emitting element 43 is transferred across a sensing circuit region 4111 and a driving circuit region 4112 of the touch sensing unit 411 and directly welded on a blank region 4113 of the touch sensing unit 411. A second solder point 432 of the LED light-emitting element 43 is transferred across the sensing circuit region 4121 and the driving circuit region 4122 of the touch sensing unit 412 and directly welded on the blank region 4123 of the touch sensing unit 412.

In the embodiments of FIGS. 3, 4 and 5, the two terminals of the LED light-emitting element are respectively installed on the two adjacent touch sensing units. It is noted that numerous modifications and alterations may be made while retaining the teachings of the invention. For example, in some other embodiments (e.g., the embodiment of FIG. 6), the LED light-emitting element is spanned across at least one touch sensing unit, and the two terminals of the LED light-emitting element are respectively installed on two touch sensing units that are not located beside each other.

Figure 6:
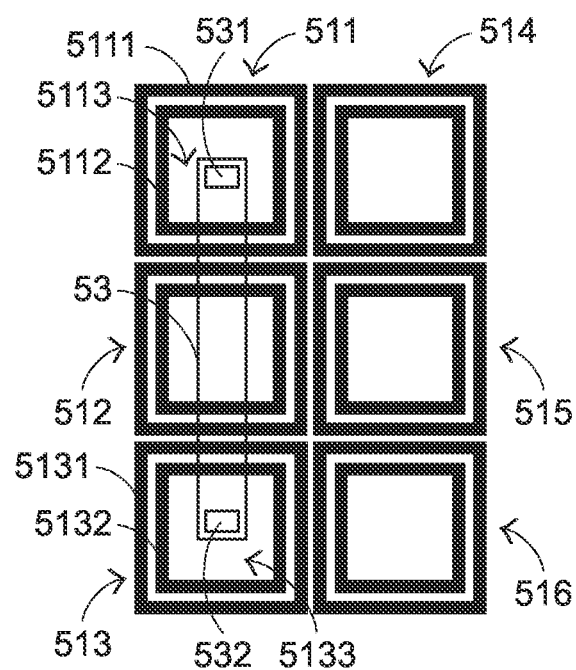
FIG. 6 schematically illustrates the relationships between the plural LED light-emitting elements and the plural touch sensing units of the touch sensing layer in a touch pad according to a fourth embodiment of the present invention.

FIG. 6 schematically illustrates the relationships between the plural LED light-emitting elements and the plural touch sensing units of the touch sensing layer in a touch pad according to a fourth embodiment of the present invention. For succinctness, only the relationship between sixth touch sensing units 511, 512, 513, 514, 515 and 516 of the touch sensing layer and the corresponding LED light-emitting elements of the plural LED light-emitting elements 53 will be described as follows. The LED light-emitting element 53 is spanned across the touch sensing unit 512 and arranged between the touch sensing unit 511 and the touch sensing unit 513, which are not located beside each other. A first solder point 531 of the LED light-emitting element 53 is transferred across a sensing circuit region 5111 and a driving circuit region 5112 of the touch sensing unit 511 and directly welded on a blank region 5113 of the touch sensing unit 511. A second solder point 532 of the LED light-emitting element 53 is transferred across the touch sensing unit 512 and the sensing circuit region 5121 and the driving circuit region 5122 of the touch sensing unit 512 and welded on a blank region 5133 of the touch sensing unit 513.

From the above descriptions, the present invention provides a touch pad with a key input function. The relationships between the plural LED light-emitting elements and the plural touch sensing units of the touch sensing layer are specially designed. Consequently, the influence of the LED light-emitting elements on the capacitive sensing effect can be avoided. Consequently, the touch pad does not need to undergo an additional sensing compensation process. When the user performs the touch control operation on any position of the touch pad, the touch pad can effectively and correctly detect or sense the touch control operation. In other words, the touch pad of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch pad with a key input function, the touch pad comprising:
    a circuit board, wherein a touch sensing layer is formed on a top surface of the circuit board, and the touch sensing layer comprises plural touch sensing units;
    plural LED light-emitting elements arranged between the plural touch sensing units;
    a light guide plate located over the touch sensing layer and arranged beside the plural LED light-emitting elements, wherein the LED light-emitting elements receive plural light beams, and the plural light beams are guided by the light guide plate, so that a surface light source is provided; and
    a light-transmissible touch structure with plural light-transmissible patterns, wherein the light-transmissible touch structure is located over the plural LED light-emitting elements and the light guide plate, and a touch control operation is performed on the light-transmissible touch structure by the user,
    wherein a first touch sensing unit of the plural touch sensing units comprises a first sensing circuit region, a first driving circuit region and a first blank region, and a second touch sensing unit of the plural touch sensing units comprises a second sensing circuit region, a second driving circuit region and a second blank region, wherein a first terminal of a first LED light-emitting element of the plural LED light-emitting elements is transferred across the first sensing circuit region and the first driving circuit region and installed in the first blank region, and a second terminal of the first LED light-emitting element is transferred across the second sensing circuit region and the second driving circuit region and installed in the second blank region.

2. The touch pad according to claim 1, wherein the first sensing circuit region and the first driving circuit region are located beside each other and collaboratively formed as a first capacitive sensing structure, and the second sensing circuit region and the second driving circuit region are located beside each other and collaboratively formed as a second capacitive sensing structure.

3. The touch pad according to claim 2, wherein the first sensing circuit region is arranged around the first driving circuit region and the first sensing circuit region and the first driving circuit region are closed-type copper foil conductor regions, or the second sensing circuit region and the second driving circuit region are open-type copper foil conductor regions in symmetric and complementary arrangement.

4. The touch pad according to claim 2, wherein the second sensing circuit region is arranged around the second driving circuit region and the second sensing circuit region and the second driving circuit region are closed-type copper foil conductor regions, or the second sensing circuit region and the second driving circuit region are open-type copper foil conductor regions in symmetric and complementary arrangement.

5. The touch pad according to claim 1, wherein the plural LED light-emitting elements are side-view LED light-emitting elements.

6. The touch pad according to claim 5, wherein the light guide plate comprises at least one light input surface, wherein the at least one light input surface is located beside and aligned with the side-view LED light-emitting elements to receive the plural light beams from the side-view LED light-emitting elements.

7. The touch pad according to claim 6, wherein the light guide plate comprises plural trench structures, wherein when the light guide plate is disposed over the touch sensing layer, the plural side-view LED light-emitting elements are inserted in the corresponding trench structures, and each of the plural trench structures has one of the at least one light input surface, wherein the light input surface of each trench structure is aligned with the corresponding side-view LED light-emitting element to receive the light beam from the corresponding LED light-emitting element.

8. The touch pad according to claim 1, wherein the light-transmissible touch structure at least comprises a mask layer and a light-transmissible plate, wherein the mask layer is located over the light guide plate, the light-transmissible plate is located over the mask layer, and the plural light-transmissible patterns are formed in the mask layer, wherein the plural light beams are transmitted through the plural light-transmissible patterns and the light-transmissible plate, and the user performs the touch control operation on a light-transmissible surface of the light-transmissible plate.

9. The touch pad according to claim 8, wherein the light-transmissible touch structure further comprises a diffusion layer, wherein the diffusion layer is arranged between the mask layer and the light-transmissible plate, and the plural light beams are diffused and homogenized by the diffusion layer.

10. The touch pad according to claim 1, wherein the first terminal of the first LED light-emitting element and the second terminal of the first LED light-emitting element are respectively installed on the first touch sensing unit and the second touch sensing unit, wherein the first touch sensing unit and the second touch sensing unit are located adjacent to each other, or the first touch sensing unit and the second touch sensing unit are not located adjacent to each other.

11. The touch pad according to claim 1, wherein a longest distance of the first blank region of the first touch sensing unit is shorter than a length of first LED light-emitting element, and a longest distance of the second blank region of the second touch sensing unit is shorter than the length of first LED light-emitting element.

12. The touch pad according to claim 1, wherein a longest distance of the first blank region of the first touch sensing unit is shorter than a distance between a first solder point and a second solder point of the first LED light-emitting element, and a longest distance of the second blank region of the second touch sensing unit is shorter than the distance between the first solder point and the second solder point of the first LED light-emitting element.

* * * * *